(12) United States Patent
Sasaki

(10) Patent No.: US 8,583,698 B2
(45) Date of Patent: Nov. 12, 2013

(54) HIERARCHICAL LOAD ESTIMATION SYSTEM, METHOD AND PROGRAM

(75) Inventor: Shigero Sasaki, Minato-ku (JP)

(73) Assignee: NEC Corporation, Tokyo (JP)

( * ) Notice: Subject to any disclaimer, the term of this patent is extended or adjusted under 35 U.S.C. 154(b) by 726 days.

(21) Appl. No.: 12/681,582

(22) PCT Filed: Aug. 21, 2008

(86) PCT No.: PCT/JP2008/064871
§ 371 (c)(1),
(2), (4) Date: Apr. 2, 2010

(87) PCT Pub. No.: WO2009/044589
PCT Pub. Date: Apr. 9, 2009

(65) Prior Publication Data
US 2010/0281305 A1   Nov. 4, 2010

(30) Foreign Application Priority Data
Oct. 3, 2007 (JP) ................................. 2007-259947

(51) Int. Cl.
*G06F 17/30* (2006.01)
*G06F 11/00* (2006.01)

(52) U.S. Cl.
USPC ......................................... 707/802; 714/38.1

(58) Field of Classification Search
None
See application file for complete search history.

(56) References Cited

U.S. PATENT DOCUMENTS

| | | | |
|---|---|---|---|
| 5,860,069 A * | 1/1999 | Wright | 1/1 |
| 5,960,423 A * | 9/1999 | Chaudhuri et al. | 707/715 |
| 6,347,366 B1 | 2/2002 | Cousins | |
| 7,003,560 B1 * | 2/2006 | Mullen et al. | 709/223 |
| 7,376,549 B2 | 5/2008 | Horikawa | |
| 7,716,447 B2 | 5/2010 | Sasaki | |
| 8,051,421 B2 * | 11/2011 | Wylie et al. | 718/104 |
| 2003/0120636 A1 * | 6/2003 | Bird et al. | 707/2 |
| 2004/0028070 A1 | 2/2004 | Barr et al. | |
| 2004/0064548 A1 * | 4/2004 | Adams et al. | 709/224 |
| 2004/0199632 A1 | 10/2004 | Romero et al. | |

(Continued)

FOREIGN PATENT DOCUMENTS

| | | |
|---|---|---|
| JP | 61-245273 A | 10/1986 |
| JP | 63-259740 A | 10/1988 |

(Continued)

OTHER PUBLICATIONS

Graham, S., et al., "gprof: A Call Graph Execution Profiler," ASM, Proceedings of the 1982 SIGPLAN Symposim on Complier Construction, vol. 17, No. 6, pp. 120-126, (1982).

(Continued)

*Primary Examiner* — Tarek Chbouki
(74) *Attorney, Agent, or Firm* — Sughrue Mion, PLLC

(57) ABSTRACT

A hierarchical load estimation system 1 has a memory device 2, an invocation count calculation module 100 and an issue count calculation module 200. Stored in the memory device 2 are a hierarchical invocation data 10 indicating design of hierarchical processing that is hierarchically invoked in a multi-layer system and an issuance data 20 specifying database manipulation sentences issued by database manipulation processing in the hierarchical processing. The invocation count calculation module 100 refers to the hierarchical invocation data 10 to calculate an invocation count of the database manipulation processing. The issue count calculation module 200 refers to the calculated invocation count and the issuance data 20 to calculate an issue count of database manipulation sentences issued by the database manipulation processing.

6 Claims, 17 Drawing Sheets

1:HIERARCHICAL LOAD ESTIMATION SYSTEM

(56) References Cited

U.S. PATENT DOCUMENTS

| | | | |
|---|---|---|---|
| 2005/0166081 A1 | 7/2005 | Etoh et al. | |
| 2005/0172306 A1* | 8/2005 | Agarwal et al. | 719/328 |
| 2006/0015512 A1* | 1/2006 | Alon et al. | 707/100 |
| 2006/0248080 A1* | 11/2006 | Gray | 707/7 |
| 2007/0011330 A1* | 1/2007 | Dinker et al. | 709/226 |
| 2007/0078825 A1* | 4/2007 | Bornhoevd et al. | 707/3 |
| 2007/0195700 A1 | 8/2007 | Katoh et al. | |
| 2008/0109390 A1* | 5/2008 | Iszlai et al. | 706/14 |
| 2008/0216098 A1* | 9/2008 | Agarwal et al. | 719/328 |
| 2008/0222090 A1 | 9/2008 | Sasaki | |
| 2009/0013154 A1* | 1/2009 | Du et al. | 712/30 |

FOREIGN PATENT DOCUMENTS

| | | |
|---|---|---|
| JP | 2-219138 A | 8/1990 |
| JP | 3-108036 A | 5/1991 |
| JP | 4-38522 A | 2/1992 |
| JP | 5-151031 A | 6/1993 |
| JP | 6-28405 A | 2/1994 |
| JP | 6-139065 A | 5/1994 |
| JP | 8-202541 A | 8/1996 |
| JP | 11-265306 A | 9/1999 |
| JP | 2000-29753 A | 1/2000 |
| JP | 2000-207255 A | 7/2000 |
| JP | 2002-183416 A | 6/2002 |
| JP | 2003-223335 A | 8/2003 |
| JP | 2004-78947 A | 3/2004 |
| JP | 2004-220453 A | 8/2004 |
| JP | 2004-288183 A | 10/2004 |
| JP | 2004-302525 A | 10/2004 |
| JP | 2005-190277 A | 7/2005 |
| JP | 2006331135 A | 12/2006 |

OTHER PUBLICATIONS

Office Action dated Mar. 26, 2013 issued by the Japanese Patent Office in corresponding Japanese Patent Application No. 2009-535996.

Mamoru Ogushi, Kazuhiko Bando, de-tabe-sushorioutoujikanmitsumoris ouchi, Toshiba Gijutsu Koukaishu, Japan, Kabushikikaisha Toshiba, Jan. 15, 2001, vol. 19-2, 12 pgs. total, (2001-0068).

Toshifumi Kamisaka, Tokushu 2 Saitekina Infurasekkeinotamenokyapasithi Puranning Part 2, Kyapasithi Puranninguno jissennshuhou, IT architect, Japan, Kabishikikaisha IDG Japan, Oct. 2, 2007, vol. 13, 12 pgs total.

Graham, S., et al., "gprof: A Call Graph Execution Profiler," ASM, Proceedings of the 1982 SIGPLAN Symposim on Complier Construction, vol. 17, No. 6, pp. 120-126, (1982).

AllFusion Erwin Data Modeler r7, J System Software, (2006), 4 pgs.

* cited by examiner

Fig. 3

11: EXTERNAL INVOCATION COUNT DATA

| EXTERNAL PROCESSING NAME | INVOCATION COUNT |
|---|---|
| SERVICE SA | 9780 |
| SERVICE SB | 584 |
| SERVICE SC | 49078 |
| ... | ... |

Fig. 4A

12: PROCEDURE INVOCATION DATA 12-1:

|  | SERVICE SA | SERVICE SB | SERVICE SC | ... |
|---|---|---|---|---|
| PROCEDURE P1A |  | ○ | ○ |  |
| PROCEDURE P1B | ○ |  |  |  |
| PROCEDURE P1C |  |  | ○ |  |
| ... |  |  |  |  |

12-2:

|  | PROCEDURE P1A | PROCEDURE P1B | PROCEDURE P1C | ... |
|---|---|---|---|---|
| PROCEDURE P2A | ○ |  |  |  |
| PROCEDURE P2B | ○ |  | ○ |  |
| PROCEDURE P2C |  | ○ | ○ |  |
| ... |  |  |  |  |

12: PROCEDURE INVOCATION DATA

|  | PROCEDURE P1A | PROCEDURE P1B | PROCEDURE P1C | ... |
|---|---|---|---|---|
| PROCEDURE P2A | 2 |  |  |  |
| PROCEDURE P2B | 1 |  | 3 |  |
| PROCEDURE P2C |  | 1 | 2 |  |
| ... |  |  |  |  |

12-2 points to the PROCEDURE P2A row.

Fig. 5

20: DML ISSUANCE DATA

|  | PROCEDURE PnA | PROCEDURE PnB | PROCEDURE PnC | ... |
|---|---|---|---|---|
| ENTITY E1 | R | R | RCU |  |
| ENTITY E2 | R |  | RCU |  |
| ENTITY E3 |  | RU |  |  |
| ... |  |  |  |  |

Fig. 6

30: DML LOAD DATA

|  | select | update | insert | delete |
|---|---|---|---|---|
| ENTITY E1 | 10 | 103 | 50 | 60 |
| ENTITY E2 | 15 | 90 | 41 | 73 |
| ENTITY E3 | 12 | 148 | 67 | 84 |
| ... |  |  |  |  |

Fig. 12

11: EXTERNAL INVOCATION COUNT DATA

| EXTERNAL PROCESSING NAME | INVOCATION COUNT |
|---|---|
| SERVICE SA | 3 |
| SERVICE SB | 10 |
| SERVICE SC | 25 |

Fig. 13

12-1: PROCEDURE INVOCATION DATA

|  | SERVICE SA | SERVICE SB | SERVICE SC |
|---|---|---|---|
| PROCEDURE P1A | ○ |  |  |
| PROCEDURE P1B | ○ | ○ |  |
| PROCEDURE P1C |  | ○ | ○ |
| PROCEDURE P1D |  |  | ○ |

Fig. 14

20: DML ISSUANCE DATA

|  | PROCEDURE P1A | PROCEDURE P1B | PROCEDURE P1C | PROCEDURE P1D |
|---|---|---|---|---|
| ENTITY | 2 | 2 | 2 | 2 |

Fig. 15

30: DML LOAD DATA

|  | DML |
|---|---|
| ENTITY | 6ms |

Fig. 16

15: LOWEST INVOCATION COUNT DATA

|  | INVOCATION COUNT |
|---|---|
| PROCEDURE P1A | 3 |
| PROCEDURE P1B | 13 |
| PROCEDURE P1C | 35 |
| PROCEDURE P1D | 25 |

Fig. 17

25: ISSUE COUNT DATA

|  | ISSUE COUNT OF DML SENTENCE |
|---|---|
| ENTITY | 152 |

Fig. 18

RES: ESTIMATED LOAD DATA

CPU UTILIZATION = 91.2%

Fig. 19

20: DML ISSUANCE DATA

|  | PROCEDURE P1A | PROCEDURE P1B | PROCEDURE P1C | PROCEDURE P1D |
|---|---|---|---|---|
| ENTITY E1 | R |  |  | R |
| ENTITY E2 |  | R |  |  |
| ENTITY E3 |  |  | RU |  |
| ENTITY E4 | D | C |  | R |

Fig. 20

30: DML LOAD DATA

|  | select | update | insert | delete |
|---|---|---|---|---|
| ENTITY E1 | 2 | | | |
| ENTITY E2 | 3 | | | |
| ENTITY E3 | 2 | 14 | | |
| ENTITY E4 | 3 | | 7 | 10 |

Fig. 21

25: ISSUE COUNT DATA

|  | select | update | insert | delete |
|---|---|---|---|---|
| ENTITY E1 | 28 | | | |
| ENTITY E2 | 13 | | | |
| ENTITY E3 | 35 | 35 | | |
| ENTITY E4 | 25 | | 13 | 3 |

Fig. 22

ESTIMATED LOAD DATA RES

|  | select | update | insert | delete | total |
|---|---|---|---|---|---|
| ENTITY E1 | 56 | 0 | 0 | 0 | 56 |
| ENTITY E2 | 39 | 0 | 0 | 0 | 39 |
| ENTITY E3 | 70 | 490 | 0 | 0 | 560 |
| ENTITY E4 | 75 | 0 | 91 | 30 | 196 |
| total | 240 | 490 | 91 | 30 | 851 |

HIERARCHICAL LOAD ESTIMATION SYSTEM, METHOD AND PROGRAM

TECHNICAL FIELD

The present invention relates to a technique for estimating load in a system. In particular, the present invention relates to a technique for estimating hierarchical load in a multi-layer system.

BACKGROUND ART

Building of a system is divided into three phases: a design phase, a development phase and an operation phase. In general, functions at the design phase, implementation at the development phase and performance at the operation phase are major issues, respectively. These phases appear not only on building a new system but also on modifying an existing system.

Sufficient computer resource for providing functions without any problem is required in order for the system to give sufficient performance at the operation phase. The required amount of the computer resource depends on load that is caused when providing the functions. A function causing less load can be provided by less computer resource, while a function causing much load requires much computer resource. Therefore, to measure system load is desirable in order to evaluate system performance.

The followings are known as techniques for measuring the system load at the operation phase. For example, it is possible to count an invocation count of each function in a program by using a profiling technique disclosed in a document "gprof: A Call Graph Execution Profiler, by S. Graham, P. Kessler and M. Mckusick, Proceedings of the 1982 SIGPLAN Symposium on Compiler Construction, Vol. 17, No. 6, pp. 120-126, 1982." Moreover, Japanese Patent Publication JP-2005-190277A discloses a method of counting invocation frequencies of server programs based on IP addresses and port numbers which can be obtained by observing communications between the server programs.

If deficiency in the system performance is discovered at the operation phase, the design and the like may be subject to revision in order to achieve sufficient performance. in this case, however, enormous process-turning-back is caused, which results in increase in costs for building the system. Conversely, if the system performance and the system load can be estimated at the upstream phase, it is possible to suppress the process-turning-back and thus suppress the increase in costs. In particular, to estimate the system load at the design phase is effective for reducing costs for building the system.

However, techniques that are conventionally available at the design phase relate mainly to functional design of the system. For example, a document "AllFusion (registered trademark) ERwin (registered trademark) Data Modeler r7" introduces "ERwin (registered trademark) " as a functional design tool for database. This tool provides such functions as conversion of logical design into physical design, optimization of individual processing, and reverse engineering of existing database. Moreover, Japanese Patent Publication JP-H08-202541 discloses a method of mutually reflecting DFD (Data Flow Diagram) change and ER (Entity Relationship) change. However, these tool and method cannot estimate the system load at the design phase.

In recent years, a "multi-layer system" having a hierarchical structure is increasing. In the multi-layer system, a service request is pipeline-processed by a plurality of server layers in order to respond to frequent changes in processing content and to easily improve performance. A three-layer system that performs display processing in a web layer, arithmetic processing in an application layer and data processing in a database layer is known as a typical multi-layer system. The performance of such a multi-layer system is determined mainly by performance of a bottleneck layer among a plurality of server layers. In the case of the above-mentioned three-layer system, for example, the database layer is in general the bottleneck and performance of the database layer determines the performance of the three-layer system. Therefore, in order to quantitatively estimate the performance of the three-layer system, it is desirable to quantitatively estimate load imposed on the database layer which tends to be the bottleneck layer.

Hierarchical load is imposed on the database layer. In the multi-layer system, processing in an upper layer invokes processing in a lower layer. That is, processing invoked by a service request invokes another processing, and the invoked processing invokes still another processing, and thus the processing is invoked hierarchically. Such the processing is hereinafter referred to as "hierarchical processing". The hierarchical load means load caused by the hierarchical processing that is thus hierarchically invoked. The database layer typically is the lowest layer in the multi-layer system. Therefore, the hierarchical load is imposed on the database layer.

Most of processing requests to the database layer are issued with "DML (Data Manipulation Language) sentence". The DML sentence is a part of SQL (Structured Query Language) sentence that is used for inquiry to database. The SQL sentence is roughly classified into three kinds: DML sentence, DDL (Data Definition Language) sentence and DCL (Data Control Language) sentence. Most loads are caused by processing of the DML sentence. The DML sentence includes "select sentence" instructing data extraction, "update sentence" instructing data update, "insert sentence" instructing data insertion, "delete sentence" instructing data deletion and so forth. A table whose data is manipulated, namely, an access-object data set is specified in the DMI, sentence. It should be noted that processing content and processing amount vary depending on the kind of the DML sentence, even if access data amount is the same. For example, only data read processing is executed in the select sentence, while not only data writing processing but also processing of writing data lock and log are executed in the update sentence.

DISCLOSURE OF INVENTION

An object of the present invention is to provide a technique that can quantitatively estimate hierarchical load in a multi-layer system at the design phase.

In a first aspect of the present invention, a hierarchical load estimation system is provided. The hierarchical load estimation system has a memory device, an invocation count calculation module and an issue count calculation module. Stored in the memory device are a hierarchical invocation data indicating design of hierarchical processing that is hierarchically invoked in a multi-layer system and an issuance data specifying database manipulation sentences issued by database manipulation processing in the hierarchical processing. The invocation count calculation module refers to the hierarchical invocation data to calculate an invocation count of the database manipulation processing. The issue count calculation module refers to the calculated invocation count and the issuance data to calculate an issue count of database manipulation sentences issued by the database manitulation processing.

In a second aspect of the present invention, a hierarchical load estimation method is provided. The hierarchical load estimation method includes: reading a hierarchical invocation data indicating design of hierarchical processing that is hierarchically invoked in a multi-layer system, from a memory device; reading an issuance data specifying database manipulation sentences issued by database manipulation processing in the hierarchical processing, from the memory device; calculating an invocation count of the database manipulation processing, with reference to the hierarchical invocation data; and calculating an issue count of database manipulation sentences issued by the database manipulation processing, with reference to the calculated invocation count and the issuance data.

In a third aspect of the present invention, a hierarchical load estimation program is provided. The hierarchical load estimation program causes a computer to perform a method including: reading a hierarchical invocation data indicating design of hierarchical processing that is hierarchically invoked in a multi-layer system, from a memory device; reading an issuance data specifying database manipulation sentences issued by database manipulation processing in the hierarchical processing, from the memory device; calculating an invocation count of the database manipulation processing, with reference to the hierarchical invocation data; and calculating an issue count of database manipulation sentences issued by the database manipulation processing, with reference to the calculated invocation count and the issuance data.

The hierarchical load imposed on the database layer can be estimated based on the issue count of the database manipulation sentences calculated according to the present invention. That is, it is possible to quantitatively estimate the hierarchical load in the multi-layer system. In estimating the hierarchical load, there is no need to actually build a system. The hierarchical load can be quantitatively estimated even at the design phase. Therefore, returning from the operation phase back to the design phase is prevented and thus the costs for building the system are reduced.

BRIEF DESCRIPTION OF DRAWINGS

The above and other objects, advantages and features of the present invention will be more apparent from the following description of certain exemplary embodiments taken in conjunction with the accompanying drawings.

FIG. 3 is a conceptual diagram showing an example of an external invocation count data.

FIG. 4A is a conceptual diagram showing an example of a procedure invocation data.

FIG. 4B is a conceptual diagram showing another example of the procedure invocation data.

FIG. 5 is a conceptual diagram showing an example of a DML issuance data.

FIG. 6 is a conceptual diagram showing an example of a DML load data.

FIG. 12 is a conceptual diagram showing the external invocation count data in first and second processing examples.

FIG. 13 is a conceptual diagram showing the procedure invocation data in the first and second processing examples.

FIG. 14 is a conceptual diagram showing the DML issuance data in the first processing example.

FIG. 15 is a conceptual diagram showing the DML load data in the first processing example.

FIG. 16 is a conceptual diagram showing a lowest invocation count data in the first processing example.

FIG. 17 is a conceptual diagram showing an issue count data in the first processing example.

FIG. 18 is a conceptual diagram showing an estimated load data in the first processing example.

FIG. 19 is a conceptual diagram showing the DML issuance data in the second processing example.

FIG. 20 is a conceptual diagram showing the DML load data in the second processing example.

FIG. 21 is a conceptual diagram showing an issue count data in the second processing example.

FIG. 22 is a conceptual diagram showing an estimated load data in the second processing example.

DESCRIPTION OF EMBODIMENTS

Exemplary embodiments of the present invention will be described with reference to the attached drawings.

1. Hierarchical Load

In an exemplary embodiment of the present invention, a technique for estimating the hierarchical load is provided. The hierarchical load is load caused by processing that is invoked through a plurality of processing layers. Let us consider an example where respective processing $a_1$ to $a_p$ invoke any ones of processing $b_1$ to $b_q$ and the respective processing $b_1$ to $b_q$ invoke any ones of processing $c_1$ to $c_r$. In this case, load caused by the processing $c_1$ to $c_r$ is the hierarchical load. The reason is that the processing $c_1$ to $c_r$ are invoked through the processing layers consisting of the processing $a_1$ to $a_p$ and the processing layer consisting of the processing $b_1$ to $b_q$, namely a plurality of processing layers.

Figure 1:
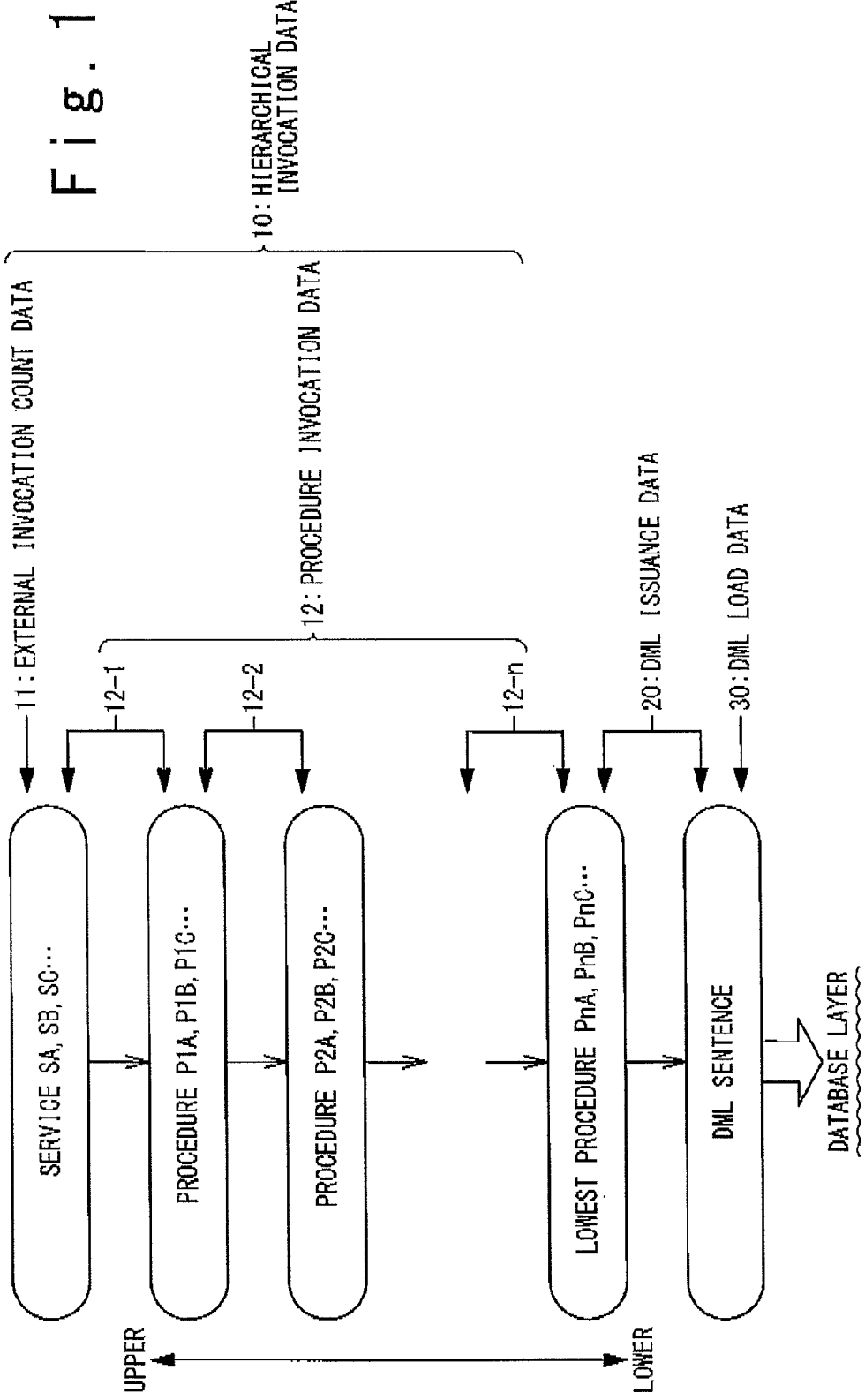
FIG. 1 is a conceptual diagram for explaining hierarchical processing in a multi-layer system and data used in an exemplary embodiment of the present invention.

In the multi-layer system, processing in an upper layer invokes processing in a lower layer, and thus the hierarchical load is caused. FIG. 1 is a conceptual diagram for explaining the hierarchical processing that is hierarchically invoked in the multi-layer system. Processing that is directly invoked by a user or processing invoked in the top of a system is hereinafter referred to as "service". The other processing is hereinafter referred to as "procedure". In the hierarchical processing, a service invokes a procedure. Moreover, in the hierarchical processing, a procedure is allowed to invoke another procedure. Here, the procedure on the invoking side (the upper layer side) is referred to as an "upper procedure", and the procedure on the invoked side (the lower layer side) is referred to as a "lower procedure".

As shown in FIG. 1, respective services (SA, SB, SC . . . ) invoke at least ones of procedures (P1A, P1B, P1C . . . ). Here, the services (SA, SB, SC . . . ) correspond to the top procedures and the procedures (P1A, P1B, PSC . . . ) correspond to the lower procedures. Further, the respective procedures (P1A, P1B, P1C . . . ) can invoke at least ones of procedures (P2A, P2B, P2C . . . ). In this case, the procedures (P1A, P1B, P1C . . . ) correspond to the upper procedures and the procedures (P2A, P2B, P2C . . . ) correspond to the lower procedures. Similarly, invocation can be performed down to procedures (PnA, PnB, PnC . . . ). Here, n is an integer equal to or more than 1. The procedure (PnA, PnB, PnC . . . ) at the bottom of the hierarchical processing is hereinafter referred to as "lowest procedure".

Also, certain processing (procedure) in a certain layer in the hierarchical processing issues a database manipulation sentence for manipulating the database layer. For example, the database manipulation sentence is DML sentence. The processing that issues the database manipulation sentence such as the DML sentence with respect to the database layer is referred to as database manipulation processing. In the present exemplary embodiment, let us consider a case where the database manipulation processing is the lowest procedure (PnA, PnB, PnC . . . ).

The lowest procedures (PnA, PnB, PnC . . . ) of the hierarchical processing issue predetermined DML sentences, respectively. The DML sentence is issued as a processing request to the "database layer" that is the lowest layer in the multi-layer system. Since the lowest procedure is invoked through the plurality of processing layers, load of the DML sentence issued by the lowest procedure is the hierarchical load. That is, the load of the DML sentence that is the hierarchical load is imposed on the database layer.

Since the database layer tends to be the bottleneck layer in the multi-layer system, it is important to estimate the hierarchical load imposed on the database layer. The exemplary embodiment of the present invention provides a technique that can quantitatively estimate the hierarchical load imposed on the database layer even at the design phase. A system for that purpose is the following "hierarchical load estimation system".

2. Hierarchical Load Estimation System

Figure 2:
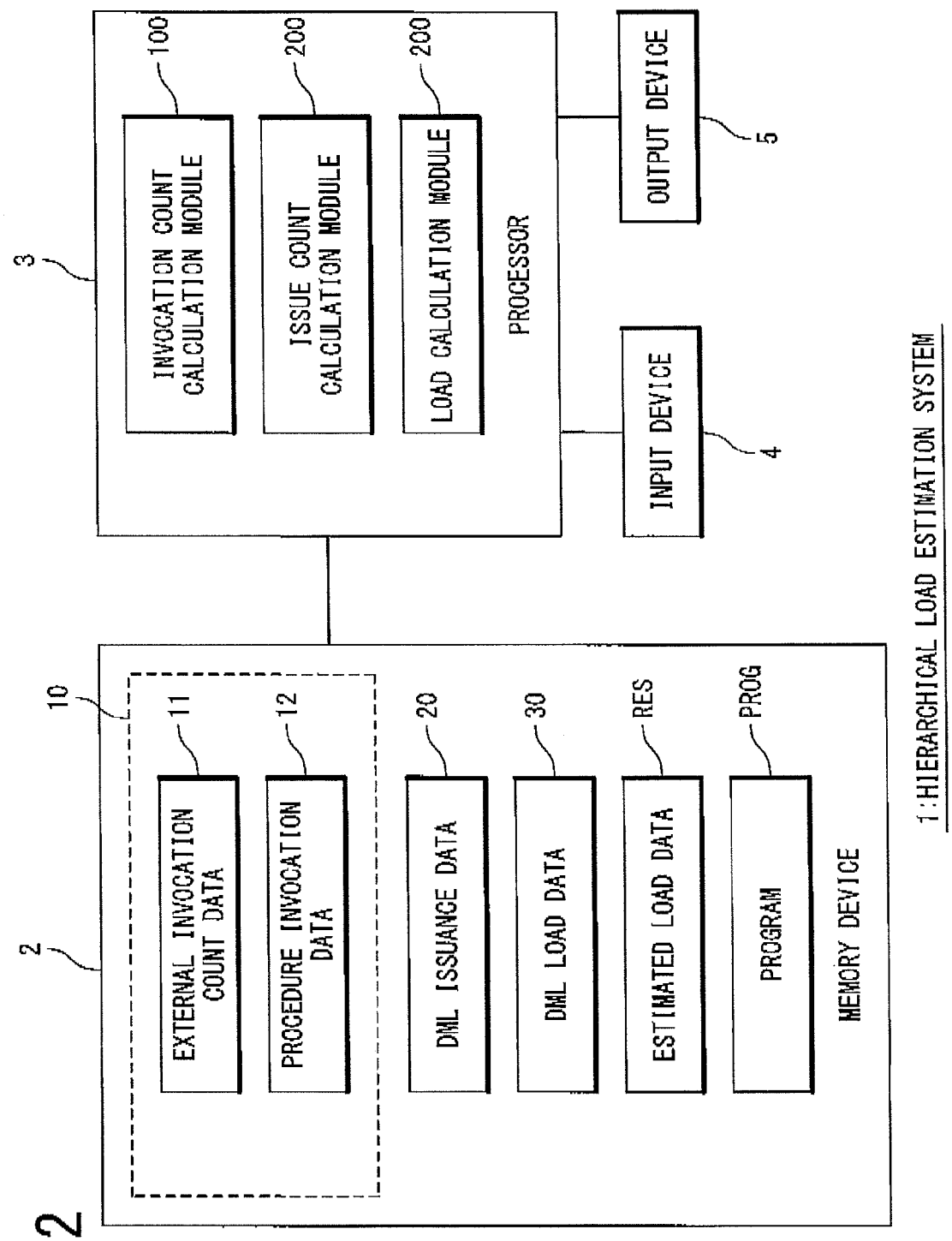
FIG. 2 is a block diagram showing a configuration example of a hierarchical load estimation system according to the exemplary embodiment of the present invention.

FIG. 2 is a block diagram showing a configuration example of the hierarchical load estimation system 1 according to the present exemplary embodiment. The hierarchical load estimation system 1 is a computer system having a memory device 2, a processor 3, an input device 4 and an output device 5. The memory device 2 is a RAM (Random Access Memory), an HDD (Hard Disk Drive) and the like. The processor 3 has a CPU (Central Processing Unit) and provides various functions by executing a program. The input device 4 is a key board, a mouse, a media drive, an input interface and the like. The output device 5 is a display, a media drive, an output interface and the like.

A hierarchical invocation data 10, a DML issuance data 20, a DML load data 30, an estimated load data RES and the like are stored in the memory device 2. The hierarchical invocation data 10 includes an external invocation count data 11 and a procedure invocation data 12. The hierarchical invocation data 10, DML issuance data 20 and DML load data 30 are used in calculating the hierarchical load, and the estimated load data RES indicates the calculation result. That is, the hierarchical load estimation system 1 receives the hierarchical invocation data 10, DML issuance data 20 and DML load data 30 and outputs the estimated load data RES.

The hierarchical invocation data 10 indicates design of the hierarchical processing as shown in the foregoing FIG. 1. More specifically, the hierarchical invocation data 10 includes the external invocation count data 11 and the procedure invocation data 12.

The external invocation count data 11 relates to the services externally demanded and indicates envisioned invocation counts of the services. FIG. 3 shows an example of the external invocation count data 11. As shown in FIG. 3, the external invocation count data 11 indicates a correspondence relationship between a service name and an envisioned invocation count with respect to each of the plurality of services (SA, SB, SC . . . ).

Whereas, the procedure invocation data 12 specifies an invocation relationship between the upper procedure and the lower procedure in the hierarchical processing. As shown in the foregoing FIG. 1, the procedure invocation data 12 can include n kinds of procedure invocation data 12-1 to 12-n (n is an integer equal to or more than 1) depending on the design of the hierarchical processing. The procedure invocation data 12-1 specifies the invocation relationship between the services (SA, SB, SC . . . ) and the lower procedures (P1A, P1B, P1C . . . ). The procedure invocation data 12-2 specifies the invocation relationship between the upper procedures (P1A, P1B, P1C . . . ) and the lower procedures (P2A, P2B, P2C . . . ) The procedure invocation data 12-n specifies the invocation relationship between the upper procedures and the lowest procedures (PnA, PnB, PnC . . . ).

FIG. 4A shows an example of the procedure invocation data 12. For example, the procedure invocation data 12-1 indicates that "the service SA invokes the procedure P1B", "the service SC invokes the procedures P1A and P1C" and so forth. The procedure invocation data 12-2 indicates that "the procedure P1A invokes the procedures P2A. and P2B" and so forth.

FIG. 4B shows another example of the procedure invocation data 12. The procedure invocation data 12 may indicate the number of times that the upper procedure invokes the lower procedure. In FIG. 4B for example, the procedure invocation data 12-2 indicates that "the procedure P1A invokes the procedure P2A twice and the procedure P2B once" and so forth.

Referring to FIG. 1 again, the DML issuance data 20 specifies the DML sentences issued by the lowest procedures (PnA, PnB, PnC . . . ). For example, the DML issuance data 20 indicates an issue count of the DML sentences issued for each entry, with respect to each of the lowest procedures (PnA, PnB, PnC . . . ). Here, the entity means the access-object table (data set) in the database.

In the present exemplary embodiment, the DML sentences may be classified based on various parameters. The various parameters include the kind of the DML sentence, CPU usage time, entity, data access amount, execution plan and the like. In the case where the DML sentences are classified, the DM issuance data 20 indicates the classification of the issued DML sentences with respect to each of the lowest procedures (PnA, PnB, PnC . . . ). For example, the DML issuance data 20 indicates the "kind" of the DML sentence issued for each entity, with respect to each lowest procedure. The kinds of the DML sentence include "select sentence" instructing data extraction, "update sentence" instructing data update, "insert sentence" instructing data insertion, "delete sentence" instructing data deletion and so forth.

FIG. 5 shows an example of the DML issuance data 20. In the example shown in FIG. 5, the DML sentences are classified based on the kind and the entity. Note that "C" represents "insert", "R" represents "select", "U" represents "update" and "D" represents "delete", and this kind of diagram is generally called CRUD diagram. The DML issuance data 20 indicates that each of the lowest procedures (PnA, PnB, PnC . . . ) issues what kind of DML sentence to which entity. For example, the lowest procedure PnB issues the select sentence to the entity E1 and issues the select sentence and the update sentence to the entity E3. The issue count of the DML sentence of each classification may be further added to the DML issuance data 20.

The DM load data 30 indicates load per DML sentence. The load includes CPU usage time, CPU utilization that is obtained by normalizing the CPU usage time, locks, capacity (size of a memory region used by table) and the like. In the case where the DML sentences are classified, the DML load data 30 indicates the load per DML sentence with respect to each classification of the DML sentence. For example, the DML load data 30 indicates the load per DML sentence issued for each entity, with respect to each kind of the DML sentence.

FIG. 6 shows an example of the DML load data 30. In FIG. 6, the load per DML sentence issued for each entity (E1, E2, E3) is indicated with respect to the kind (select, update, insert, delete) of the DML sentence. The load is the CPU utilization. For example, the CPU utilization of the select sentence issued for the entity E1 is 10 and the CPU utilization of the update sentence for the same is 103. It should be noted that the load varies depending on the kind of the DMI, sentences even though the DML sentences are for the same entity.

Note that the above-described external invocation count data 11, procedure invocation data 12, DML issuance data 20 and DML load data 30 are design information that can be obtained at the design phase.

Referring to FIG. 2 again, a hierarchical load estimation program PROG is further stored in the memory device 2. The hierarchical load estimation program PROG is a computer program that causes the hierarchical load estimation system 1 to perform calculation processing of the hierarchical load. Typically, the hierarchical load estimation program PROG is recorded on a computer-readable recording medium and read out from the recording medium to the memory device 2.

The processor 3 performs the calculation processing of the hierarchical load by executing the hierarchical load estimation program PROG. More specifically, the processor 3 has an invocation count calculation module 100, an issue count calculation module 200 and a load calculation module 300. The invocation count calculation module 100, the issue count calculation module 200 and the load calculation module 300 are realized by the processor 3 executing the hierarchical load estimation program PROG and respectively provide predetermined data processing functions. The data processing by the invocation count calculation module 100, the issue count calculation module 200 and the load calculation module 300 will be described below in detail.

3. Processing Flow

Figure 7:
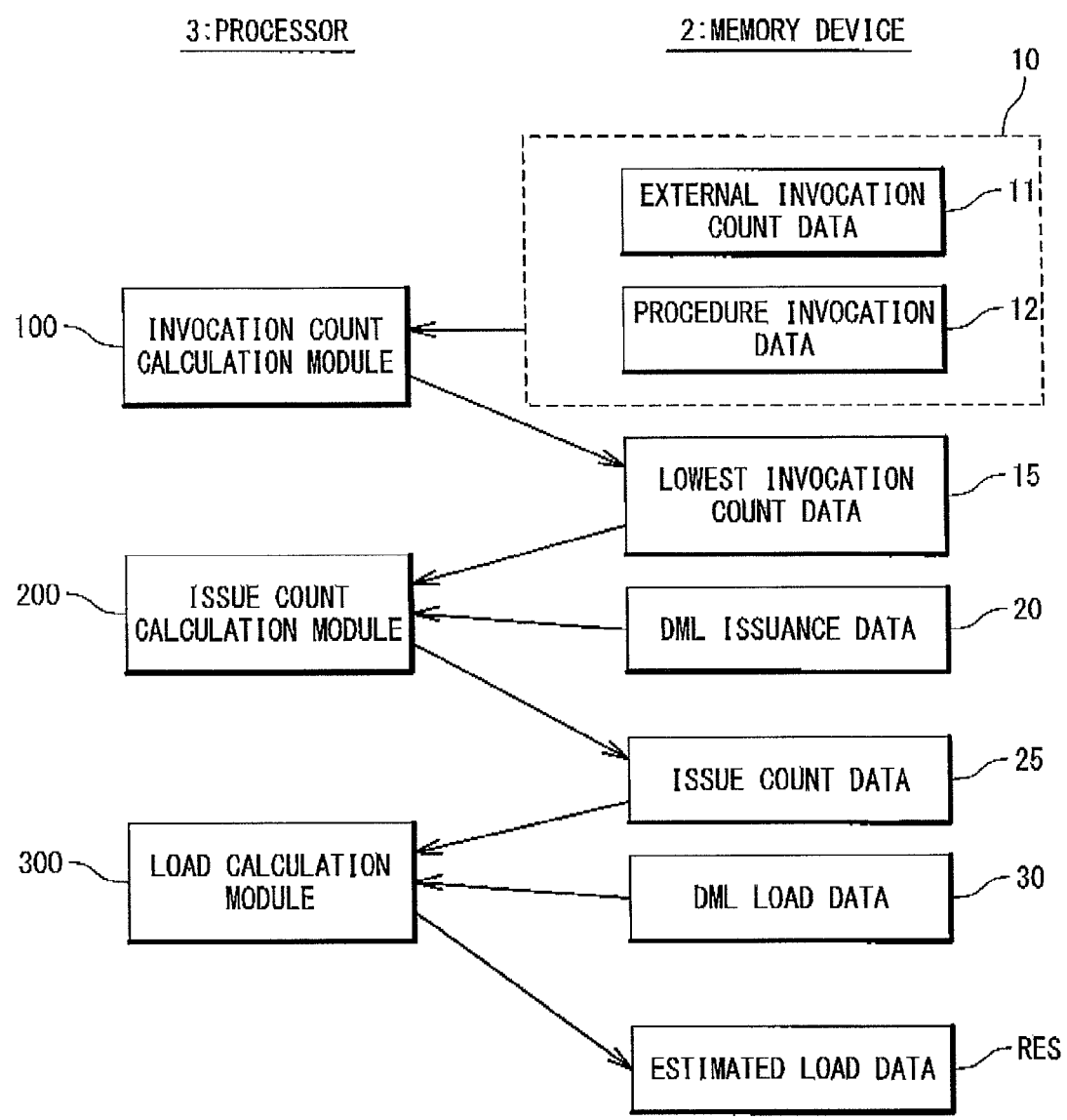
FIG. 7 is a block diagram showing a processing flow by a hierarchical load system according to the exemplary embodiment of the present invention.
Figure 8:
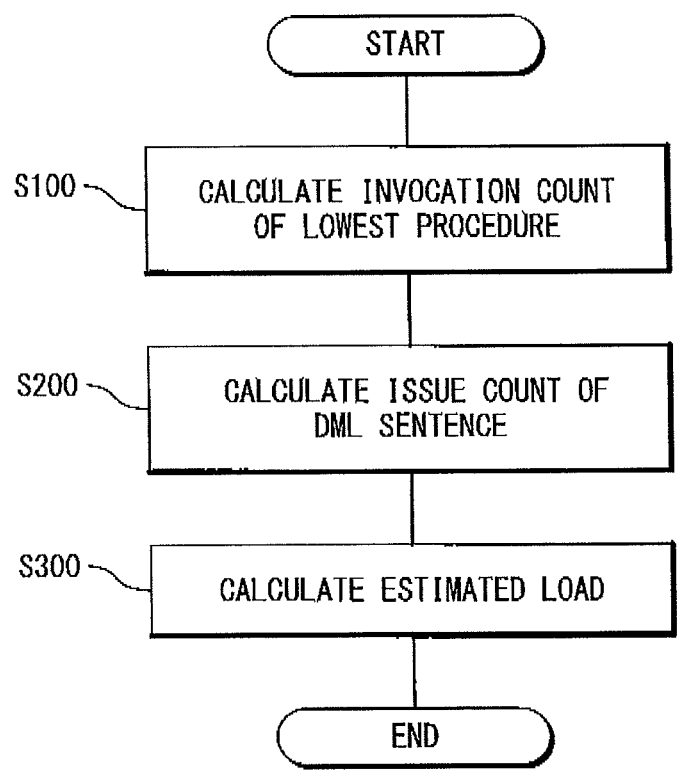
FIG. 8 is a flow chart showing the processing flow by the hierarchical load system according to the exemplary embodiment of the present invention.

FIG. 7 and FIG. 8 respectively are a block diagram and a flowchart showing a processing flow according to the hierarchical load system 1.

Step S100:

The invocation count calculation module 100 reads the hierarchical invocation data 10 (the external invocation count data 11 and the procedure invocation data 12) from the memory device 2. Then, the invocation count calculation module 100 refers to the hierarchical invocation data 10 to calculate an invocation count of the lowest procedures (PnA, PnB, PnC . . . ). As described above, the external invocation count data 11 indicates the respective invocation counts of the top services (SA, SB, SC . . . ), and the procedure invocation data 12 specifies the invocation relationship between the upper procedure and the lower procedure. Therefore, the invocation count calculation module 100 can calculate, by using the external invocation count data 11 and the procedure invocation data 12, an invocation count of the procedure of each layer in order from the upper layer towards the lower layer. As a result, the invocation count of the lowest procedures (PnA, PnB, PnC . . . ) is calculated. The calculated invocation count is stored as a lowest invocation count data 15 in the memory device 2.

Step S200:

The issue count calculation module 200 reads the lowest invocation count data 15 and the DML issuance data 20 from the memory device 2. As described above, the lowest invocation count data 15 indicates the invocation count and the DML issuance data 20 indicates the DML sentences to be issued, with regard to the lowest procedures (PnA, PnB, PnC . . . ). Therefore, the issue count calculation module 200 can calculate, by referring to the lowest invocation count data 15 and the DML issuance data 20, an issue count of the DML sentences issued by the lowest procedures. That is, the issue count calculation module 200 calculates the issue count of the DML sentences issued in the hierarchical processing. In the case where the DML sentences are classified as described above, the issue count of the DML sentence may be calculated with respect to each classification. The calculated issue count of the DML sentences is stored as an issue count data 25 in the memory device 2.

Step S300:

The load calculation module 300 reads the issue count data 25 and the DML load data 30 from the memory device 2. As described above, the issue count data 25 indicates the issue count of the DML sentences and the DML load data 30 indicates the load per DML sentence. Therefore, the load calculation module 300 can calculate, by referring to the issue count data 25 and the DML load data 30, the load of the DML sentences issued by the lowest procedures. That is, the load calculation module 300 calculates the load of the DML sentences issued in the hierarchical processing. In the case where the DML sentences are classified as described above, the load of the DML sentences maybe calculated with respect to each classification. The calculated load of the DML sentences is stored as the estimated load data RES in the memory device 2. The calculated load of the DML sentences represents an estimated value of the load (estimated load) imposed on the database layer in the multi-layer system. That is, the estimated load data RES indicates an estimated value of the hierarchical load imposed on the database layer. A system builder can estimate computer resource required for achieving sufficient system performance, by referring to the estimated load data RES.

The Step S100 and Step S200 will be described below in more detail.

3-1. Step S100

Figure 9:
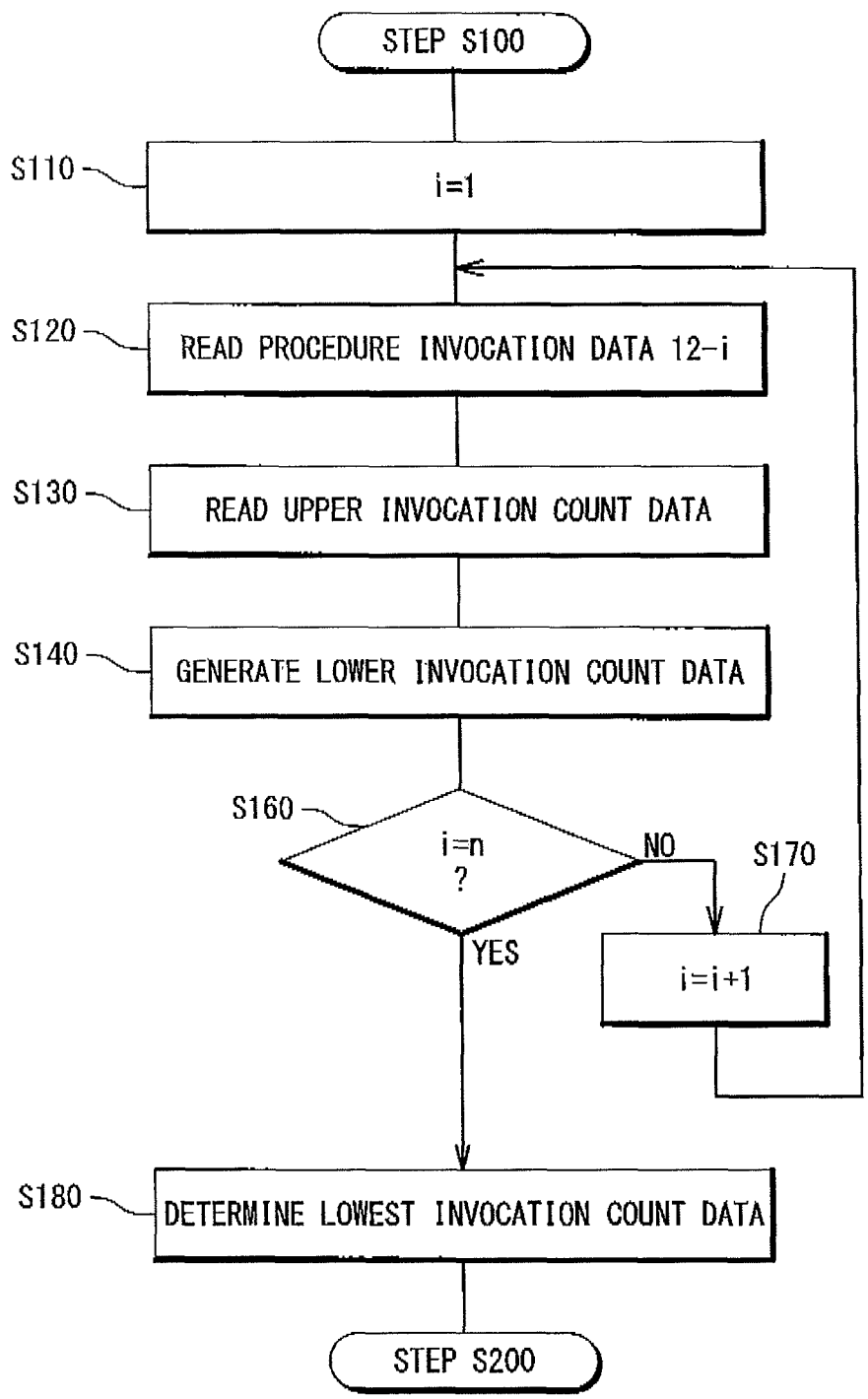
FIG. 9 is a flow chart showing Step S100.

In Step S100, the invocation count calculation module 100 generates the lowest invocation count data 15 from the hierarchical invocation data 10. FIG. 9 is a flow chart showing Step S100.

First, a counter i used for loop processing is set to 1 (Step S110). The loop processing is performed a number of times equivalent to the number of the procedure invocation data 12-1 to 12-n. That is, the counter i is changed one-by-one from the initial value 1 to the final value n.

In each loop processing, the procedure invocation data 12-i is read from the memory device 2 (step S120). Also, an upper invocation count data is read (Step S130). Here, the "upper invocation count data" indicates invocation counts of respective upper procedures in the procedure invocation data 12-i. Next, invocation counts of respective lower procedures in the procedure invocation data 12-i are calculated based the invocation counts of the upper procedures and the procedure invocation data 12-i (Step S140). It is a "lower invocation count data" that indicates the invocation counts of the respective lower procedures. If the counter i is less than the final value n (Step S160; No), 1 is added to the counter i (Step S170) and the next loop processing is performed.

More specifically, the counter i is 1 at first and the procedure invocation data 12-1 is referred to. In this case, the upper procedures are the services (SA, SB, SC . . . ) and the upper invocation count data is the external invocation count data 11, (refer to FIG. 8). Therefore, the external invocation count data 11 is read from the memory device 2. The external invocation count data 11 indicates the invocation counts of the respective services (SA, SB, SC . . . ), and the procedure invocation data 12-1 specifies the invocation relationship between the services and the procedures (P1A, P1B, P1C . . . ). It is therefore possible to generate the lower invocation count data indicating invocation counts of the respective lower procedures (P1A, P1B, P1C . . . ), based on the external invocation count data 11 and the procedure invocation data 12-1.

Next, the counter i becomes 2, and the procedure invocation data 12-2 is referred to. In this case, the upper procedures are the procedures (P1A, P1B, P1C . . . ). Therefore, the lower invocation count data generated by the previous loop processing is used as the upper invocation count data in the current loop processing. Thus, invocation counts of respective lower procedures (P2A, P2B, P2C . . . ) are calculated based on the procedure invocation data 12-2 and the upper invocation count data.

The similar loop processing is repeated until the counter i reaches the final value n. Eventually, invocation counts of the respective lowest procedures (PnA, PnB, PnC . . . ) are calculated. If the counter i is equal to the final value n (Step S160; Yes), the loop processing ends. Data indicating the invocation counts of the lowest procedures that is eventually obtained is the lowest invocation count data 15 (Step S180). In this manner, the invocation count of the procedure of each layer is calculated in order from the upper layer towards the lower layer according to the present exemplary embodiment. Consequently, the invocation counts of the lowest procedures are calculated and the lowest invocation count data 15 is generated.

Figure 10:
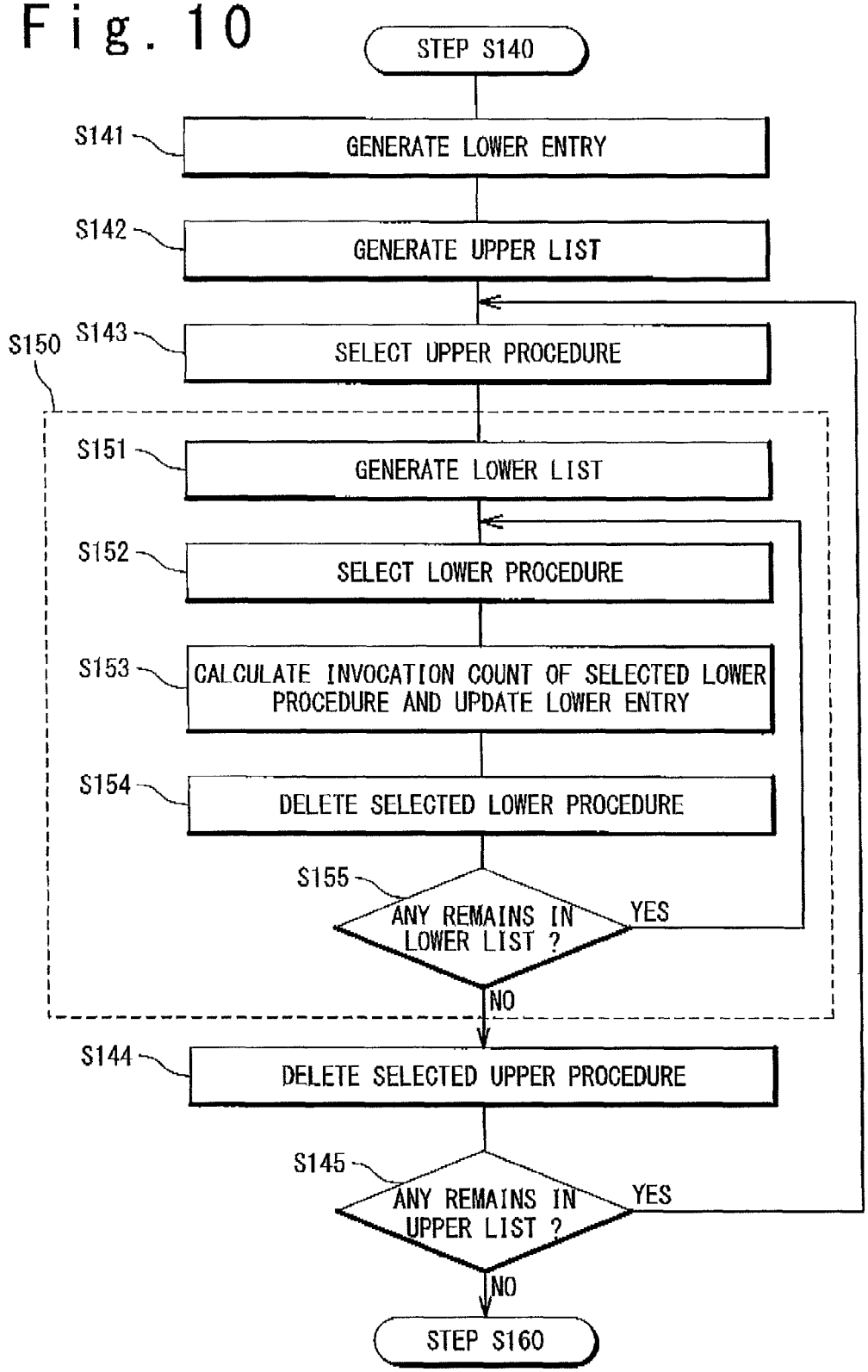
FIG. 10 is a flow chart showing an example of Step S140.

Various methods are possible for calculating the invocation, counts of the lower procedures in the above-mentioned Step S140. FIG. 10 is a flow chart showing an example. First, a lower entry is generated (Step S141). The lower entry is a table having fields of lower procedure IDs and invocation counts. To calculate each field value of the lower entry is an object of Step S140. An initial value of each field is set to 0.

Next, an upper list indicating a list of the upper procedures is generated (Step S142). Subsequently, an arbitrary one upper procedure is selected from the upper list (Step S143). Next, invocation counts of respective lower procedures invoked by the selected upper procedure are calculated (Step S150). The calculated invocation counts of the lower procedures are respectively added to corresponding field values in the lower entry. After that, the selected upper procedure is deleted from the upper list (Step S144). If any other upper procedure remains in the upper list (Step S145; Yes), the processing returns back to Step S143. If no upper procedure remains (Step S145; No), the Step S140 ends.

The Step S150 is as follows. First, a lower list indicating a list of the lower procedures invoked by the selected upper procedure is generated (Step S151). Subsequently, an arbitrary one lower procedure is selected from the lower list (Step S152). Next, an invocation count of the selected lower procedure is calculated. Here, the total invocation count of the selected upper procedure is given by the upper invocation count data. Therefore, in the case where the procedure invocation data 12-i indicates the kind of the lower procedure invoked by the upper procedure (refer to FIG. 4A), the total invocation count of the selected upper procedure is the invocation count of the selected lower procedure. In the case where the procedure invocation data 12-i indicates a count of the selected lower procedure invoked by the single selected upper procedure (refer to FIG. 4B), the count is multiplied by the total invocation count of the selected upper procedure and thereby the invocation count of the selected lower procedure is calculated. The calculated invocation count of the selected lower procedure is added to the corresponding field value in the lower entry and thus the lower entry is updated (Step S153). After that, the selected lower procedure is deleted from the lower list (Step S154). If any other lower procedure remains in the lower list (Step S155; Yes), the processing returns back to Step S152. If no lower procedure remains (Step S155; No), the Step S150 ends.

3-2. Step S200

Figure 11:
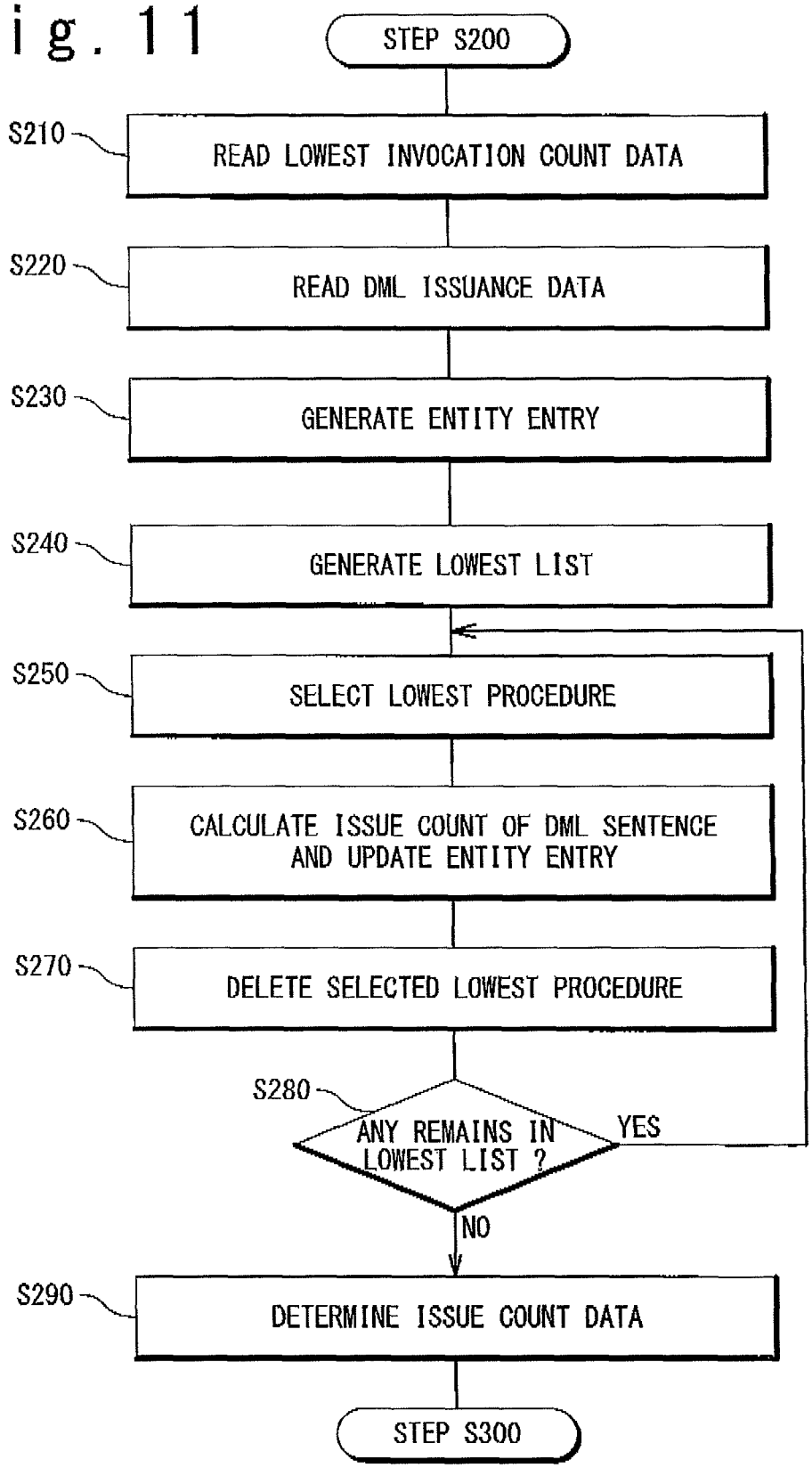
FIG. 11 is a flow chart showing Step S200.

In Step S200, the issue count calculation module 200 calculates the issue count data 25 from the lowest invocation count data 15 and the DML issuance data 20. FIG. 11 is a flow chart of Step S200. First, the lowest invocation count data 15 is read from the memory device 2 (Step S210). Also, the DML issuance data 20 is read from the memory device 2 (Step S220).

Next, an entity entry is generated (Step S230). The entity entry is a table having fields of entity IDs indicated by the DMI, issuance data 20 and issue counts of the DML sentences. In the case where the DML sentences are classified as described above, the field of the issue count is prepared for each classification of the DML sentence. To calculate each field value of the entity entry is an object of Step S200. An initial value of each field is set to 0.

Next, a lowest list is generated (Step S240). The lowest list is a list of the lowest procedures (PnA, PnB, PnC . . . ) indicated by the lowest invocation count data 15. Subsequently, an arbitrary one lowest procedure is selected from the lowest list (Step S250).

Next, an issue count of the. DML sentences issued by the selected lowest procedure is calculated. As described above, the lowest invocation count data 15 indicates the total invocation count of each lowest procedure and the DML issuance data 20 specifies the DML sentences issued by each lowest procedure. Let us consider a case where the DML issuance data 20 indicates an issue count of the DML sentences issued by a single lowest procedure. In this case, the issue count is multiplied by the total invocation count of the selected lowest procedure, and thereby a total issue count of the DML sentences due to the selected lowest procedure. In the case where the DML sentences are classified, the issue count of the DML sentence is calculated in a similar manner with respect to each classification. The issue count of the DML sentences thus calculated is added to the corresponding field value in the entity entry, and thus the entity entry is updated (Step S260).

After that, the selected lowest procedure is deleted from the lowest list (Step S270). If any other lowest procedure remains in the lowest list (Step S280; Yes), the processing returns back. to Step S250. If no lowest procedure remains (Step S280; No), the calculation processing of the issue count of the. DML sentences ends. The eventual entity entry corresponds to the issue count data 25. That is, the issue count data 25 indicating the issue count of the DML sentences issued in the hierarchical processing is determined (Step S290).

4. Processing Examples

Next, concrete examples of the processing by the hierarchical load estimation system 1 according to the present exemplary embodiment will be described below.

4-1. First Processing Example

FIG. 12 shows the external invocation count data 11 in the first processing example. The external invocation count data 11 indicates respective invocation counts of three kinds of services SA, SB and SC. Here, each invocation count is an envisioned number of times of service requests per 1 second. It should be noted that a unit time is not limited to 1 second but can be set to an arbitrary value.

FIG. 13 shows the procedure invocation data 12 in the first processing example. For simplicity, the parameter n is 1. That is, the lowest procedures are the procedures P1A. to P1D invoked by the services SA to SC. The same applies to a case where the parameter n is 2 or more. As shown in FIG. 13, the procedure invocation data 12-1 indicates an invocation relationship between the services SA to SC and the procedures P1A to P1D. More specifically, the service SA invokes the procedures P1A, and P1B, the service SB invokes the procedures P1B and P1C, and the service SC invokes the procedures P1C and P1D.

FIG. 14 shows the DML issuance data 20 in the first processing example. In the first processing example, the database layer is treated as one entity for simplicity. As shown in FIG. 14, the DML issuance data 20 indicates the issue count of the DML sentence for the entity with respect to each of the lowest procedures P1A to P1D. More specifically, each of the lowest procedures P1A to P1D issues two DML sentences per single invocation.

FIG. 15 shows the DML load data 30 in the first processing example. The ma, load data 30 is so created as to conform to the format of the DML issuance data 20. Specifically, the database layer is treated as one entity. As shown in FIG. 15, the DML load data 30 indicates the load per one DML sentence for the entity. Here, the load is an average execution time. In the example shown in FIG. 15, the average execution time of every DML sentence is 6 ms.

In Step S100, invocation counts of the respective lowest procedure P1A to P1D are calculated based on the external invocation data 11 shown in FIG. 12 and the procedure invocation data 12 shown in FIG. 13. The lower entry, the upper list and the lower list used in Step S140 (refer to FIG. 10) can be easily generated from the procedure invocation data 12. That is, the lower entry has fields of invocation counts of the respective lowest procedures P1A to P1D. The upper list includes the services SA, SE and SC. The lower list associated with the service SA includes the lowest procedures P1A and P1B. The lower list associated with the service SB includes the lowest procedures P1B and P1C. The lower list associated with the service SC includes the lowest procedures P1C and P1D. As a result of Step S100, the lowest invocation count data 15 shown in FIG. 16 is obtained. The invocation counts of the lowest procedures P1A, P1B, P1C and P1D are 3, 13, 35 and 25, respectively.

In Step S200, a total issue count of the DML sentences is calculated based on the lowest invocation count data 15 shown in FIG. 16 and the DML issuance data 20 shown in FIG. 14. The entity entry can be easily generated from the DML issuance data 20. In the first example, since the database layer is treated as one entity, only one entity ID is included in the entity entry. As a result of Step S200, the issue count data 25 shown in FIG. 17 is obtained. Since each of the lowest procedures P1A to P1D issues two DML sentences per single invocation, the total issue count of the DML sentences is 152.

In Step S300, the load of the DML sentences is calculated based on the issue count data 25 shown in FIG. 17 and the DML load data 30 shown in FIG. 15. Since the total issue count of the DML sentences is 152 and the average execution time per one DML sentence is 6 ms, the total execution time of the DML sentences is calculated to be 912 ms (=152×6 ms). Note here that the issuance of the DML sentences is a result of the envisioned service requests per 1 second (refer to FIG. 12). That is, a period of 912 ms per 1 second is spent for execution of the DML sentences as a result of the service requests. In other words, the CPU utilization is 91.2%. The CPU utilization=91.2% is the load estimated in the present example. FIG. 18 shows the estimated load data RES generated in the present example.

It should be noted that the issue count (=152) of the DML sentences also is a parameter relating to the load. Therefore, the estimated load data RES may include not only the load calculated in Step S300 but also the issue count of the DML sentences calculated in Step S200. Alternatively, only the issue count of the DML sentences calculated in Step S200 may be given as the estimated load data RES.

By utilizing the estimated CPU utilization (91.2%), a system builder can estimate computer resource required for achieving sufficient system performance even at the design phase. For example, in a case where there is operationally no problem if the CPU utilization is not more than 92%, it is estimated that one CPU is enough. In a case where the CPU utilization needs to be maintained not more than 50%, the system builder can consider to increase the number of CPU to two. Alternatively, the system builder can estimate that the DML sentences and data structure optimization need to be achieved at higher level. Alternatively, the system builder can consider to suppress the service amount to be provided.

Moreover, the load can be respectively estimated with respect to plural kinds of the external invocation count data 11, namely, different service providing scenarios. In this case, it is possible to estimate computer resource amount enough for adopting a part of or all of the service providing scenarios. Alternatively, it is possible to discriminate between service providing scenarios applicable within a range of scheduled computer resource and the others. In this manner, the present exemplary embodiment can support planning the service providing scenario at the design phase.

The load estimation according to the present exemplary embodiment can be performed not only when a system is to be newly built but also when an existing system is to be modified. For example, modifications are reflected in the DML issuance data 20 and the procedure invocation data 12 of the existing system, and then the load is estimated. If the service providing scenario is modified, the load is estimated after the modification is reflected in the external invocation count data 11. If hardware constituting the system is changed (e.g. CPU is replaced), the load is estimated after the change in hardware specification is reflected in the DML load data 30.

4-2. Second Processing Example

In the second processing example, the external invocation count data 11 and the procedure invocation data 12 are the same as in the first processing example. Therefore, the result of Step S100 is the same as in the first processing example, and the lowest invocation count data 15 is as shown in the foregoing FIG. 16.

FIG. 19 shows the DML issuance data 20 in the second processing example. In the second processing example, the DML sentences are classified, and the DML issuance data 20 indicates the classification of the DML sentence issued with respect to each of the lowest procedures P1A to P1D. More specifically, the DML sentences are classified based on the "kind of DML sentence" and the "entity". Here, four entities E1 to E4 and four kinds "C (insert)", "R (select)", "U (update)" and "D (delete)" are considered. The respective lowest procedures P1A to P1D issue any kinds of the DML sentences to at least any ones of the entities E1 to E4. As shown in FIG. 19, the DML issuance data 20 indicates entities and kinds of the DML sentences issued by the respective lowest procedures P1A to P1D. For example, a single lowest procedure P1A issues the select sentence for the entity E1 and issues the delete sentence for the entity E4.

FIG. 20 shows the DMZ load data 30 in the second processing example. The DML load data 30 is so created as to conform to the format of the DML issuance data 20. That is, the DML load data 30 indicates the load per DML sentence with respect to each classification of the DML sentence. As in the case of the first processing example, the load is the average execution time. For example, the average execution time of the select sentence for the entity E1 is 2 ms, and the average execution time of the update sentence for the entity E3 is 14 ms. The reason why blank fields are left is that the execution time of the DML sentence that is not issued is unnecessary.

In Step S200, the issue count of the DML sentences is calculated based on the lowest invocation count data 15 shown in FIG. 16 and the DML issuance data 20 shown in FIG. 19. At this time, the issue count of the DML sentences is calculated with respect to each of the above-mentioned classifications of the DML sentence. Therefore, the entity entry (issue count data 25) is a table that indicates the issue count of the DMI, sentences with respect to each classification. Such a table format is similar to the DML load data 30 in which the load (execution time) is replaced with the issue count. As a result of Step S200, the issue count data 25 shown in FIG. 21 is obtained. For example, a total of 28 select sentences are issued for the entity E1, a total of 35 update sentences are issued for the entity E3.

In Step S300, the load of the DML sentences is calculated based on the issue count data 25 shown in FIG. 21 and the DML load data 30 shown in FIG. 20. At this time, the load of the DML sentences is calculated with respect to each of the above-mentioned classifications of the DML sentence. As a result of Step S300, the estimated load data RES shown in FIG. 22 is obtained. The estimated load data RES shown in FIG. 22 indicates the execution time [ms] of the DML sentence per 1 second, namely, the CPU usage time [ms] per 1 second, with respect to each classification of the DML sentence. Note that the CPU utilization [%] can be obtained by dividing the CPU usage time [ms] per 1 second by 10. Moreover, a "total column" and a "total row" are added to the estimated load data RES shown in FIG. 22. The total row indicates partial sum of the CPU usage times with respect to each classification. On the other hand, the total column indicates partial sum of the CPU usage times with respect to each entity. A field belonging to both of the total row and the total column indicates summation (851 ms) of the CPU usage times of all the DML sentences.

The estimated load data RES may include the issue count of the DML sentences with respect to each classification that is calculated in Step S200. The estimated load data RES generated in the second processing example can be used as in the same case of the first processing example. Furthermore, since the load and the issue count of the DML sentences are calculated with respect to each classification, the following usages are also possible.

The load calculated for each classification is effective for identifying a DML sentence to which attention should particularly be paid at the design stage. For example, it can be seen from the estimated load data RES shown in FIG. 22 that the load (490 ms) of the update sentences for the entity E3 is more than half the total load (851 ms). Therefore, a system builder can determine that to optimize the update sentences for the entity E3 is effective for improving the performance.

The partial sum of the load for each entity is effective for identifying an entity to which attention should particularly be paid at the design stage. For example, it can be seen from the estimated load data RES shown in FIG. 22 that the load (560 ms) regarding the entity E3 is more than half the total load (851 ms). Therefore, a system builder can determine that to optimize the design of the entity E3 is effective for improving the performance. Meanwhile, since contribution of the load regarding the entity E2 to the total load is small, a system builder can determine that optimization of the design of the entity E2 has few advantages.

It is possible to quantitatively estimate probability of locks by analyzing the issue count that is calculated with respect to each DML sentence kind and entity. Basically, DML sentences accessing to different entities do not access to the same data. Meanwhile, DML sentences accessing to the same entity access to the same data. In this case, locks may be caused. The locks cause increases in the CPU usage time of the DML sentence as well as delay, and therefore the locks should be taken into consideration at the design phase. For example, in the case of the example shown in the foregoing FIG. 21, only data reading due to the select sentence occurs with respect to the entities E1 and E2. Therefore, occurrence probability of the locks regarding the entities E1 and E2 is considered to be extremely low. Whereas, as to the entity E4, data writing due to the insert sentence and the delete sentence also occurs, and thus the locks are more likely to be caused. Moreover, as to the entity E3, data writing due to lots of update sentences and data reading due to lots of select sentences occur, and thus occurrence probability of the locks is considered to be further higher than that in the case of the entity E4. By quantitatively evaluating the probability of the locks in this manner at the design phase, it is possible to consider entity division and the like.

To analyze the calculated issue count with respect to each kind of the DML sentence is effective for capacity design of the database at the design phase. For example, it can be seen from the issue count data 25 shown in FIG. 21 that 13 insert sentences and 3 delete sentences per 1 second are issued for the entity E4. If the insert sentence performs one line insertion and the delete sentence performs one line deletes, a total number of lines of the entity E4 is estimated to increase by 10 per 1 second. If one line corresponds to 64 bytes, memory capacity required by the entity E4 is estimated to increase by 640 bytes per 1 second and more than 5 Mbytes per 1 day. This kind of quantitative estimation is effective for the capacity design of the database.

In the case where the DML sentences are classified, load estimation precision for a plurality of different external invocation count data 11 can be improved. In a case where the execution time of the DML sentence is different between classifications, the average execution time of the DML sentence also is different if a ratio of the DML sentences is different. To calculate the average execution time for each ratio is generally difficult, which results in low load estimation precision for different ratios of the DML sentence, namely, different external invocation count data 11. Therefore, the load estimation precision can be improved by using the average execution time for each classification.

5. Effects

According to the exemplary embodiment of the present invention, at least the following effects can be obtained. That is, the number of DML sentences issued by the hierarchical processing in response to envisioned service request is calculated quantitatively. Since the issue count of the DML sentences relates to the load imposed on the database layer, the load imposed on the database layer can be estimated based on the calculated issue count of the DML sentences. That is, it is possible to quantitatively estimate the hierarchical load in the multi-layer system.

In estimating the hierarchical load, there is no need to actually build a system. The hierarchical load can be quantitatively estimated even at the design phase. A system builder can estimate computer resource required for achieving sufficient system performance by referring to the estimated hierarchical load. That is, it is possible at the design phase to quantitatively estimate the hierarchical load in response to envisioned service request and thereby estimate necessary computer resource. As a result, returning from the operation phase back to the design phase is prevented and thus the costs for building the system are reduced.

While the exemplary embodiments of the present invention have been described above with reference to the attached drawings, the present invention is not limited to these exemplary embodiments and can be modified as appropriate by those skilled in the art without departing from the spirit and scope of the present invention.

This application is based upon and claims the benefit of priority from Japanese patent application No 2007-259947, filed on Oct. 3, 2007, the disclosure of which is incorporated herein in its entirely by reference.

The invention claimed is:

1. A hierarchical load estimation system comprising:
a memory device which stores:
  a hierarchical invocation data indicating a design of hierarchical processing that is hierarchically invoked in a multi-layer system, the hierarchical invocation data including:
    a first data indicating an invocation count of top processing of the hierarchical processing, the top processing including an externally demanded service; and
    a second data specifying an invocation relationship between upper processing of the hierarchical processing and lower processing of the hierarchical processing;
  an issuance data specifying database manipulation sentences issued by database manipulation processing in said hierarchical processing; and
  a load data indicating a load per a database manipulation sentence;
an invocation count calculation module configured to refer to said hierarchical invocation data to calculate an invocation count of said database manipulation processing by using said first data and said second data, thereby calculating an invocation count of processing of each layer in order from an upper layer towards a lower layer;
an issue count calculation module configured to refer to said calculated invocation count and said issuance data to calculate an issue count of the database manipulation sentences issued by said database manipulation processing; and
a load calculation module configured to refer to said calculated issue count and said load data to calculate a load of the database manipulation sentences issued by said database manipulation processing.

2. The hierarchical load estimation system according to claim 1,
wherein said issuance data indicates an issue count of the database manipulation sentences with respect to each of said database manipulation processing,
said issue count calculation module calculates a sum of the issue counts of the database manipulation sentences issued by said database manipulation processing,
and said load calculation module calculates a sum of the load of the database manipulation sentences issued by said database manipulation processing.

3. The hierarchical load estimation system according to claim 1,
wherein said issuance data indicates classification of the database manipulation sentences with respect to each of said database manipulation processing,
said issue count calculation module calculates said issue count with respect to each of said classification,
said load data indicates the load per a database manipulation sentence with respect to each of said classification, and
said load calculation module calculates said load with respect to each of said classification.

4. The hierarchical load estimation system according to claim 1,
wherein said multi-layer system includes a database layer, and said load calculation module calculates said load as load imposed on said database layer.

5. A hierarchical load estimation method comprising:
reading hierarchical invocation data indicating a design of hierarchical processing that is hierarchically invoked in a multi-layer system, from a memory device, the hierarchical invocation data including:
  a first data indicating an invocation count of top processing of the hierarchical processing, the top processing including an externally demanded service; and
  a second data specifying an invocation relationship between upper processing of the hierarchical processing and lower processing of the hierarchical processing;
reading an issuance data specifying database manipulation sentences issued by database manipulation processing in said hierarchical processing, from said memory device;
calculating an invocation count of said database manipulation processing, with reference to said hierarchical invocation data, by using said first data and said second data, thereby calculating an invocation count of processing of each layer in order from an upper layer towards a lower layer;
calculating an issue count of database manipulation sentences issued by said database manipulation processing, with reference to said calculated invocation count and said issuance data;
reading a load data indicating load per a database manipulation sentence, from said memory device; and
calculating load of the database manipulation sentences issued by said database manipulation processing, with reference to said calculated issue count and said load data.

6. A hierarchical load estimation program recorded on a computer-readable recording medium that causes a computer to perform a method comprising:
reading a hierarchical invocation data indicating a design of hierarchical processing that is hierarchically invoked in a multi-layer system, from a memory device, the hierarchical invocation data including:
  a first data indicating an invocation count of top processing of the hierarchical processing, the top processing including an externally demanded service; and
  a second data specifying an invocation relationship between upper processing of the hierarchical processing and lower processing of the hierarchical processing;
reading an issuance data specifying database manipulation sentences issued by database manipulation processing in said hierarchical processing, from said memory device;

calculating an invocation count of said database manipulation processing, with reference to said hierarchical invocation data, by using said first data and said second data, thereby calculating an invocation count of processing of each layer in order from an upper layer towards a lower layer;

calculating an issue count of database manipulation sentences issued by said database manipulation processing, with reference to said calculated invocation count and said issuance data;

reading a load data indicating load per a database manipulation sentence, from said memory device; and calculating load of the database manipulation sentences issued by said database manipulation processing, with reference to said calculated issue count and said load data.

* * * * *